(12) United States Patent
Ehlen

(10) Patent No.: US 10,283,161 B2
(45) Date of Patent: May 7, 2019

(54) STORAGE CARD ADAPTER

(71) Applicant: Facebook, Inc., Menlo Park, CA (US)

(72) Inventor: Jon Brian Ehlen, Newark, CA (US)

(73) Assignee: Facebook, Inc., Menlo Park, CA (US)

(*) Notice: Subject to any disclaimer, the term of this patent is extended or adjusted under 35 U.S.C. 154(b) by 73 days.

(21) Appl. No.: 15/608,204

(22) Filed: May 30, 2017

(65) Prior Publication Data

US 2018/0350402 A1 Dec. 6, 2018

(51) Int. Cl.
*H01R 13/648* (2006.01)
*G11B 25/04* (2006.01)
*G11B 25/10* (2006.01)

(52) U.S. Cl.
CPC ............ *G11B 25/046* (2013.01); *G11B 25/10* (2013.01); *G11B 2220/17* (2013.01); *G11B 2220/2529* (2013.01)

(58) Field of Classification Search
CPC .................................................. G11B 25/046
USPC ........................................................ 174/527
See application file for complete search history.

(56) References Cited

U.S. PATENT DOCUMENTS

| | | | | |
|---|---|---|---|---|
| 7,341,461 B1* | 3/2008 | Yen | ...................... | H05K 5/0282 439/630 |
| 2003/0235040 A1* | 12/2003 | Liu | ...................... | G06K 7/0021 361/737 |
| 2005/0085130 A1* | 4/2005 | Lai | ...................... | H01R 31/065 439/638 |
| 2010/0325330 A1* | 12/2010 | Liang | ...................... | G06F 1/185 710/302 |

\* cited by examiner

*Primary Examiner* — Stanley Tso
(74) *Attorney, Agent, or Firm* — FisherBroyles, LLP

(57) ABSTRACT

Technology is provided for a storage card adapter. The storage card adapter is used for housing storage cards (e.g., M.2 storage cards), and the storage card adapter can then be inserted into a drive bay. The storage card adapter includes an adapter frame and an adapter cover. The adapter frame includes a pair of guide posts having a ledge upon which one end of a storage card rests when the storage cards are installed in storage card connectors on a printed circuit board installed in the storage card adapter. The adapter cover includes a pair of clamping posts that are aligned to engage with the guide posts when the adapter cover is fully mated with the adapter frame. In this manner, the end of the storage card becomes clamped between the guide post and the clamping post to thereby secure the storage card within the storage card adapter.

17 Claims, 7 Drawing Sheets

STORAGE CARD ADAPTER

TECHNICAL FIELD

This patent application is directed to storage card adapters, and more specifically, to M.2 storage card adapters configured to be housed in hard disc drive (HDD) storage trays.

BACKGROUND

Printed circuit boards having M.2 connectors traditionally provide a configuration in which a first end of an M.2 storage card is inserted into the M.2 connector at an angle, followed by pushing down on the opposite end of the M.2 storage card so that the M.2 storage card is aligned substantially parallel with the printed circuit board. When a printed circuit board having M.2 connectors and M.2 storage cards inserted therein is housed in an adapter, the cover of the adapter can be used to push the end of the M.2 storage card down into parallel alignment with the printed circuit board. However, care needs to be taken with respect to what part of the M.2 storage card is contacted by the cover when the cover is used to push down on the M.2 storage card. For example, if the cover contacts fragile components of the M.2 storage card, this can cause damage to the M.2 storage card.

BRIEF DESCRIPTION OF THE DRAWINGS

Embodiments of the storage card adapters disclosed herein may be better understood by referring to the following Detailed Description in conjunction with the accompanying drawings, in which like reference numerals indicate identical or functionally similar elements.

Figure 1:
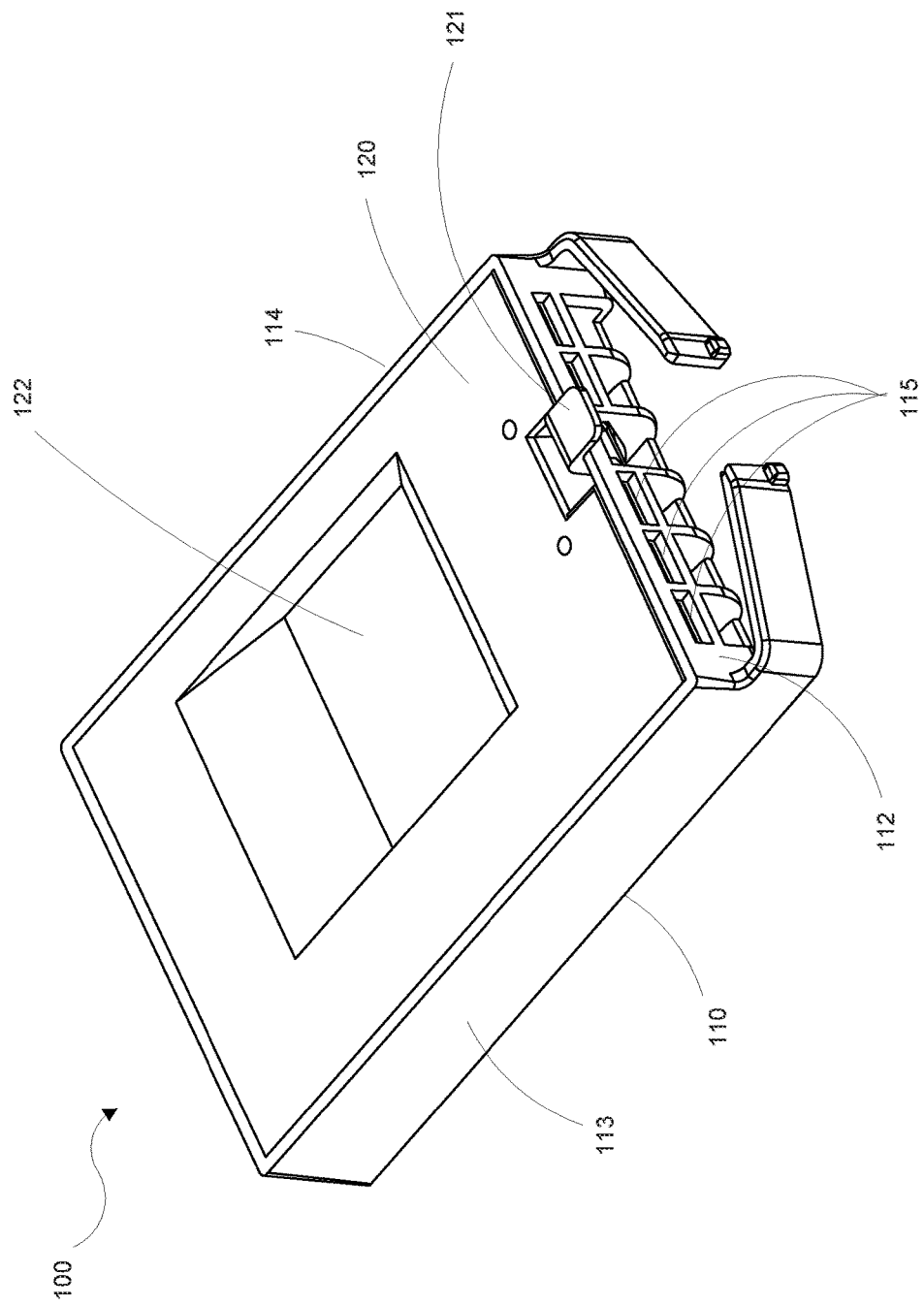
FIG. 1 is an isometric view of a storage card adapter according to a representative embodiment.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. On the contrary, the embodiments are intended to cover all suitable modifications, equivalents, and alternatives falling within the scope of the embodiments as defined by the appended claims.

DETAILED DESCRIPTION

Overview

A storage card adapter is disclosed. In an embodiment, a storage card adapter is used for housing storage cards in a manner that minimizes or eliminates the risk of damaging the storage cards when the storage cards are mounted within the storage card adapter. The storage card adapter includes an adapter frame and an adapter cover configured to mate with an open top of the adapter frame and form an enclosed area within which can be disposed one or more storage cards. The adapter frame has an envelope compatible with a drive bay, for example, and a pair of guide posts protruding away from a bottom wall of the adapter frame at one end of the adapter frame. Each guide post includes a ledge configured to support an end of a storage card housed within the storage card adapter. The adapter cover includes a pair of clamping posts protruding away from the adapter cover at one end of the adapter cover. Each clamping post aligns with and contacts a corresponding guide post when the adapter cover is mated with the adapter frame. An end of a storage card resting on the ledge of the guide post is clamped between the guide post and the clamping post when the adapter cover is mated with the adapter cover.

General Description

Various examples of the devices introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description. The terminology used below is to be interpreted in its broadest reasonable manner, even though it is being used in conjunction with a detailed description of some specific examples of the embodiments.

FIG. 1 illustrates a storage card adapter 100 according to a representative embodiment. The overall dimensions of the storage card adapter 100 are selected such that the storage card adapter 100 has an envelope compatible with a drive bay into which the storage card adapter 100 can be inserted. For example, in the depicted embodiment, the storage card adapter 100 has an envelope compatible with a drive bay configured to receive a 3.5 inch hard drive.

The storage card adapter 100 includes an adapter frame 110 and an adapter cover 120. The adapter frame 110 includes a first end wall 111, a second end wall 112 opposite the first end wall 111, a first side wall 113 and a second side wall 114 opposite the first side wall 114. The dimensions of the adapter cover 120 are such that the adapter cover 120 fits within the space defined by the first end wall 111, the second end wall 112, the first side wall 113 and the second side wall 114.

The adapter cover 120 includes a latch 121 at one end of the adapter cover 120. The latch 121 is configured to snap fit with the second end wall 112 of the adapter frame and thereby securely connect the adapter cover 120 with the adapter frame 110. In some embodiments, the second end wall 112 of the adapter frame 110 includes a plurality of vents 115 and the latch 121 creates a snap fit when the latch 121 receives a portion of the second end wall 112 between a vent 115 and the top edge of the second end wall 112. The latch 121 has sufficient elasticity that it may be pressed away from the second end wall 112 to release the latch 121 from the adapter frame 110. The adapter cover 120 can also include a depression 122 located centrally on the adapter cover 120. The depression 122 helps to direct air flow and aid in ventilating the enclosed space formed when the adapter cover 120 mates with the adapter frame 110.

Figure 2A:
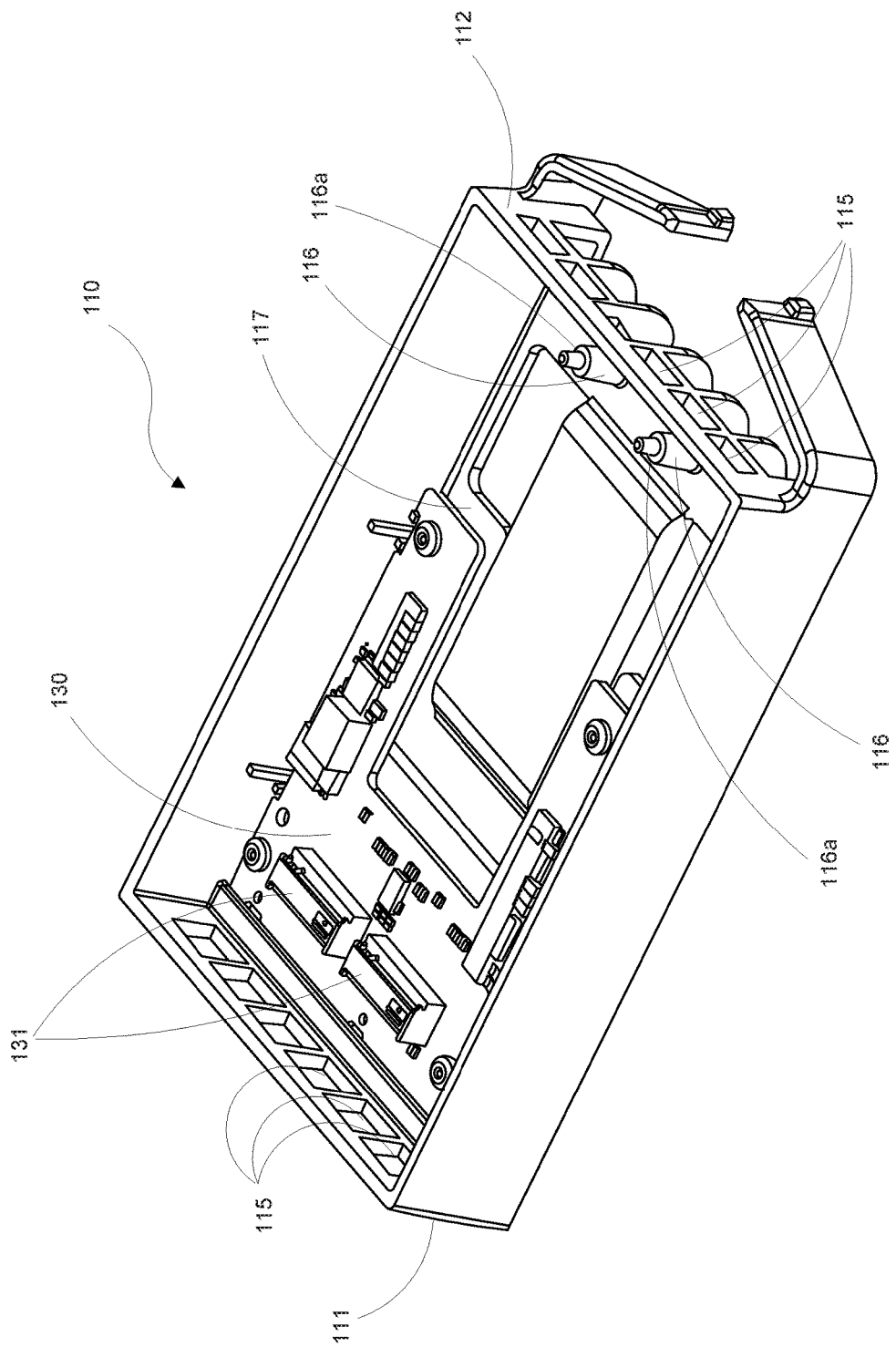
FIG. 2A is an isometric view of the adapter frame of the storage card adapter shown in FIG. 1.
Figure 2B:
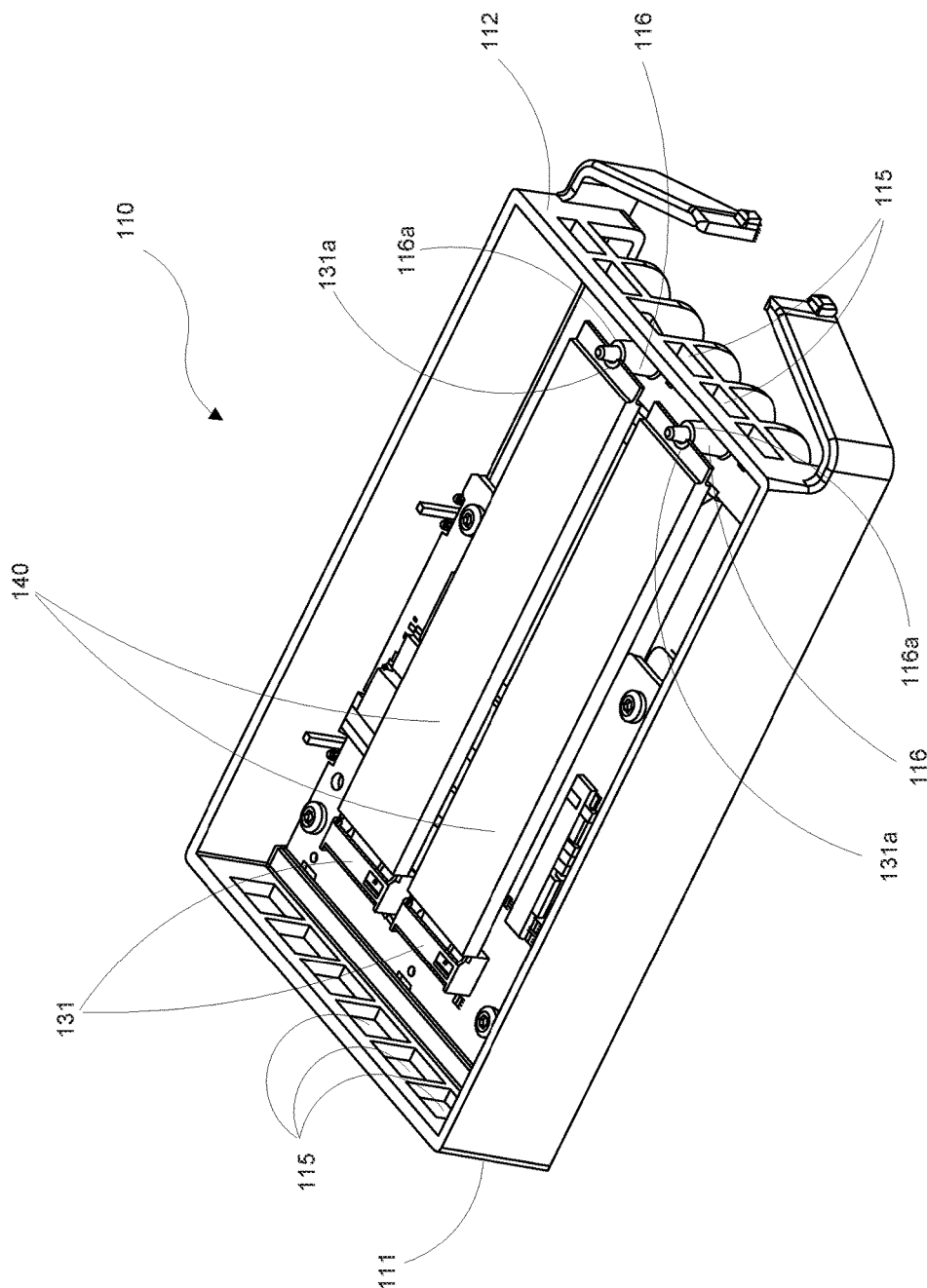
FIG. 2B is an isometric view of the adapter frame shown in FIG. 2A with two M.2 storage cards provided in the adapter frame.

The adapter frame 110 shown in FIG. 2A is configured to receive and house a printed circuit board 130 having, for example, two storage card connectors 131 that each have a receiving slot configured to releasably receive a mating edge portion of a storage card 140 (FIG. 2B). The adapter frame 110 includes a printed circuit board connector (not shown) to which the printed circuit board 130 is connected when housed within the adapter frame 110. In some embodiments, the printed circuit board connector is provided proximate the first end wall 111 so that the storage card connectors 131 are positioned proximate the first end wall 111 when the printed circuit board 130 is housed within the adapter frame 110. Both the first end wall 111 and the second end wall 112 include a plurality of vents 115 to assist with ventilating warm air inside the storage card adapter.

The adapter frame 110 includes a pair of support members 116 located proximate the second end wall 112. In some embodiments, the support members 116 are guide posts. For convenience, the embodiments disclosed herein will all be described wherein the support members 116 are guide posts. However, it should be appreciated that in any of the embodiments described herein, any other type of support members can be used in place of the referenced guide posts 116.

In some embodiments, each guide post 116 is aligned with a storage card connector 131 such that the guide post 116 is centered with a corresponding storage card connector 131 at an opposite end of the adapter frame 110. Each guide post 116 protrudes away from a bottom wall 117 of the adapter frame 110 in a direction generally perpendicular to the bottom wall 117. Each guide post 116 includes a ledge 116a at a location along the height of the guide post 116. In some embodiments, this ledge 116a is formed where the diameter of the guide post 116 transitions from a first larger diameter at the lower portion of the guide post 116 to a second smaller diameter at the upper portion of the guide post 116. In some embodiments, the upper portion of the guide post 116 (i.e., the portion of the guide post above the ledge 116a) may have a tapered shape. The ledge 116a may be formed where the tapered terminal end of the guide post 116 begins on the guide post 116.

The guide post 116 is sized so the distance between the ledge 116a and the bottom wall 117 is substantially equal to the distance between the receiving slot in the corresponding storage card connector 131 when the printed circuit board 130 is installed in the adapter frame 110. As shown in FIG. 2B, this ensures that the storage cards 140 inserted in the storage card connectors 131 are positioned approximately parallel to the printed circuit board 130 when the distal end of the storage cards 140 rest on the ledge 116a of the guide posts 116. FIG. 2B also illustrates how the distance between the storage card connectors 131 and the guide posts 116 is specifically designed such that only a distal edge portion 131a of the storage card 131 contacts the ledge 116a. In some embodiments, the distal edge portion 131a of the storage card 131 supported on or otherwise contacting the ledge 116a is a relatively durable and/or non-functional portion of the storage card 140 such that operation of the storage card 140 is not impacted or affected by the interface with the guide post 116 or the clamping post (described in greater detail below).

Figure 3:
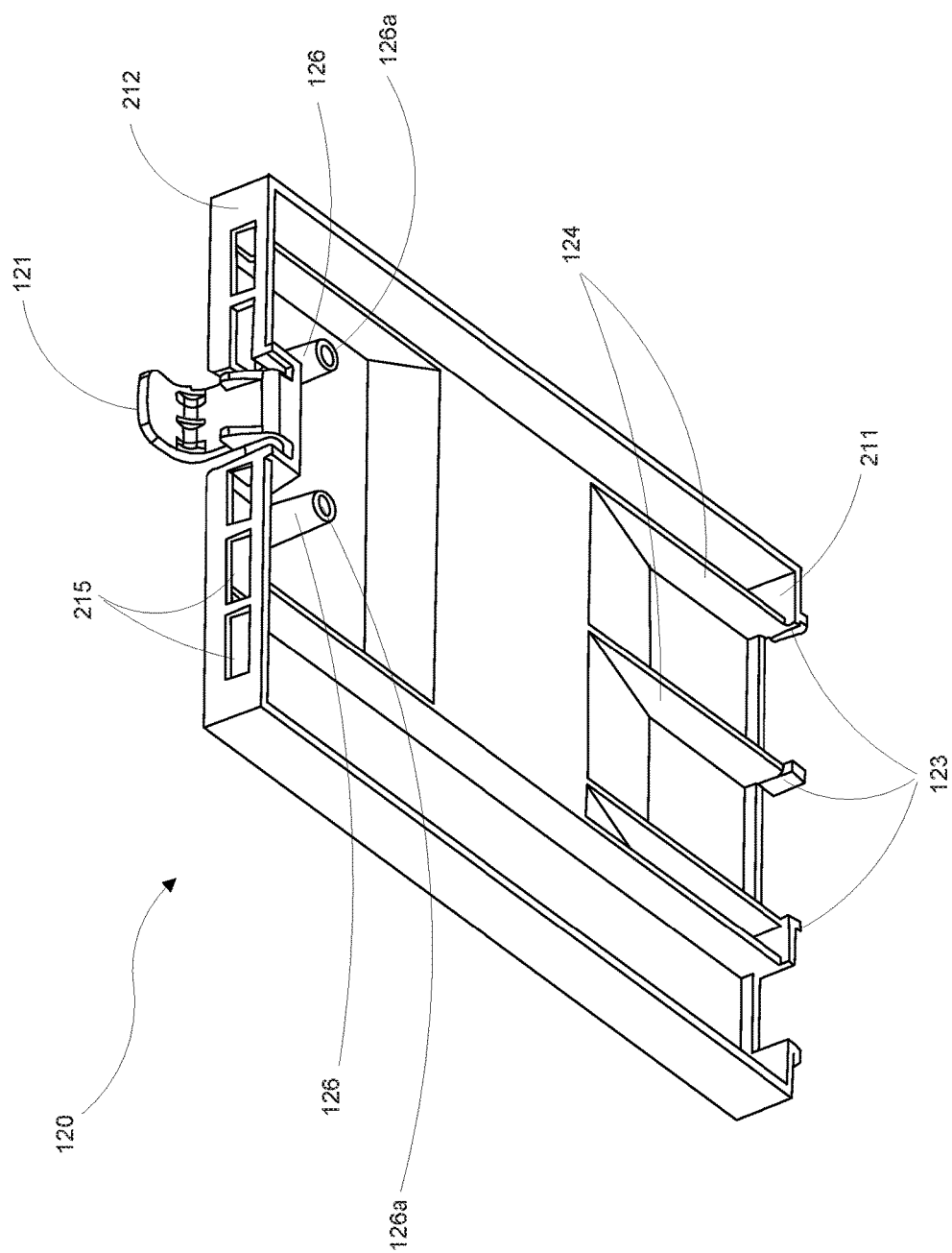
FIG. 3 is an isometric view of the adapter cover of the storage card adapter shown in FIG. 1.

With reference to FIG. 3, the adapter cover 120 includes the latch 121 at a second end wall 212. The latch 121 operates as previously described with respect to the latch 121 shown in FIG. 1. At the first end wall 211, the adapter cover 120 includes a plurality of tabs 123 that are configured to fit into the vents 115 in the first end wall 111 of the adapter frame 110 (FIG. 2A) when the adapter cover 120 is mated with the adapter frame 110 (FIG. 2A). Together with the latch 121, these tabs 123 help to ensure that the adapter cover 120 mates with and secures to the adapter frame 110 (FIG. 2A) to form an enclosed space. The adapter cover 120 also includes fins 124 that, together with the depression 122, help to promote air flow and ventilation as well as providing structural rigidity of the adapter cover. The end wall 212 may also include one or more vents 215 to further promote air flow and ventilation.

The adapter cover 120 further includes a pair of clamping members 126 located proximate the second end wall 212 of the adapter cover 120. In some embodiments, the clamping members 126 are clamping posts. For convenience, the embodiments disclosed herein will all be described wherein the clamping members 126 are clamping posts. However, it should be appreciated that in any of the embodiments described herein, any other type of clamping member can be used in place of the referenced clamping posts 126.

Each clamping post 126 protrudes away from the adapter cover 120 in a direction generally perpendicular to the adapter cover 120. The clamping posts 126 are positioned on the adapter cover 120 such that when the adapter cover 120 is mated with the adapter frame 110 (FIG. 2A), each clamping post 126 aligns with a corresponding guide post 116 (FIG. 2A). In some embodiments, each clamping post 126 includes a recess 126a in the distal end of the of the clamping post 126 that is sized and configured to receive the end of the corresponding guide post 116 (for example, the portion of the corresponding guide post 116 having the smaller diameter). In some embodiments, the depth of the recess 126a is such that it can receive all of the smaller diameter portion of the corresponding guide post 116 such that the distal end of the clamping post 126 contacts the ledge 116a of the corresponding guide post 116. This configuration thereby allows the clamping post 126 to clamp down on an end of a storage card 140 resting on the ledge 116a of the guide post 116 and thereby secure the storage card 140 in place between the guide post 116 and the clamping post 126. In some embodiments, the dimensions of the clamping post 126 are selected such that the clamping post 126 only contacts a portion of the storage card 140 that is relatively durable and/or non-functional to thereby avoid damaging the storage card 140.

Figure 4A:
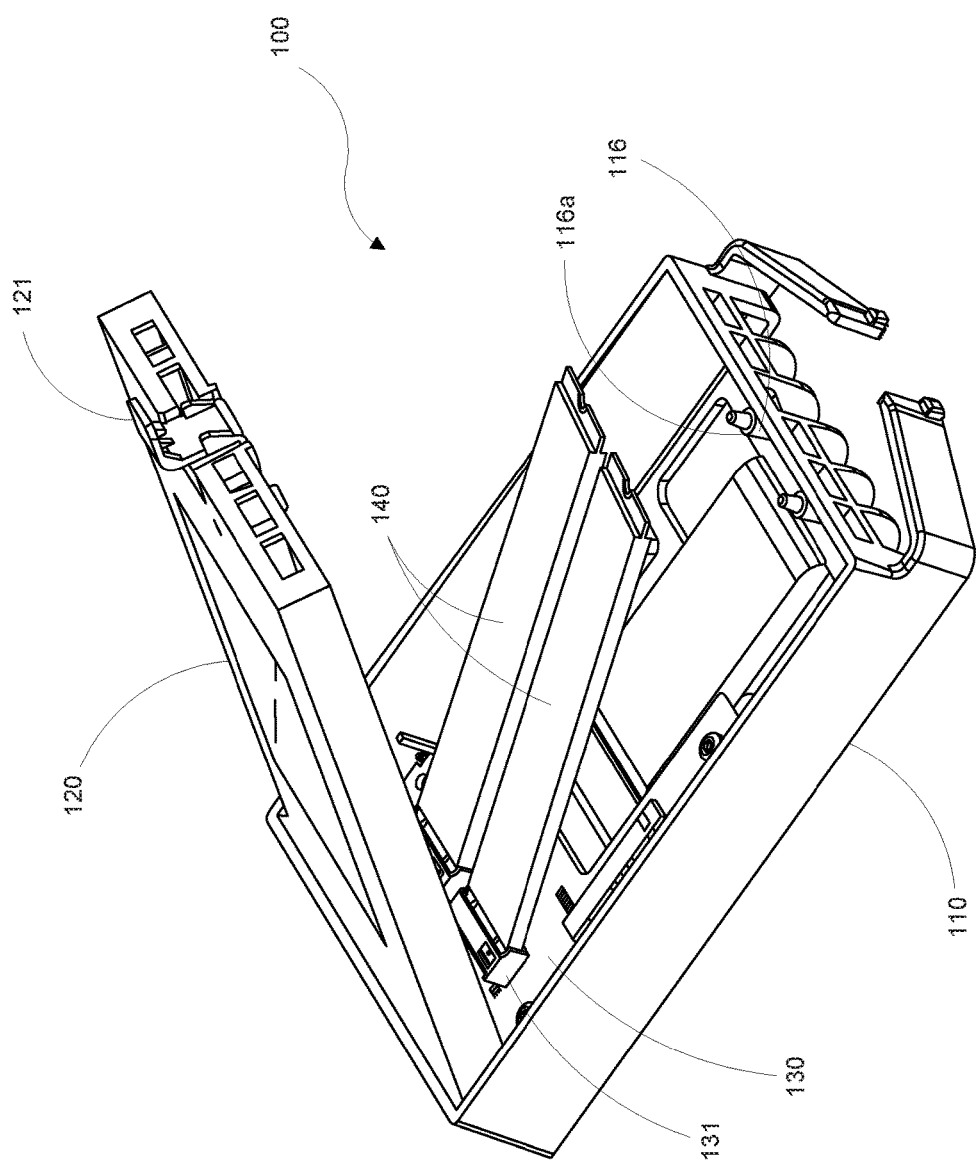
FIGS. 4A and 4B are isometric views of the storage card adapter shown in FIG. 1 in an open configuration.
Figure 4B:
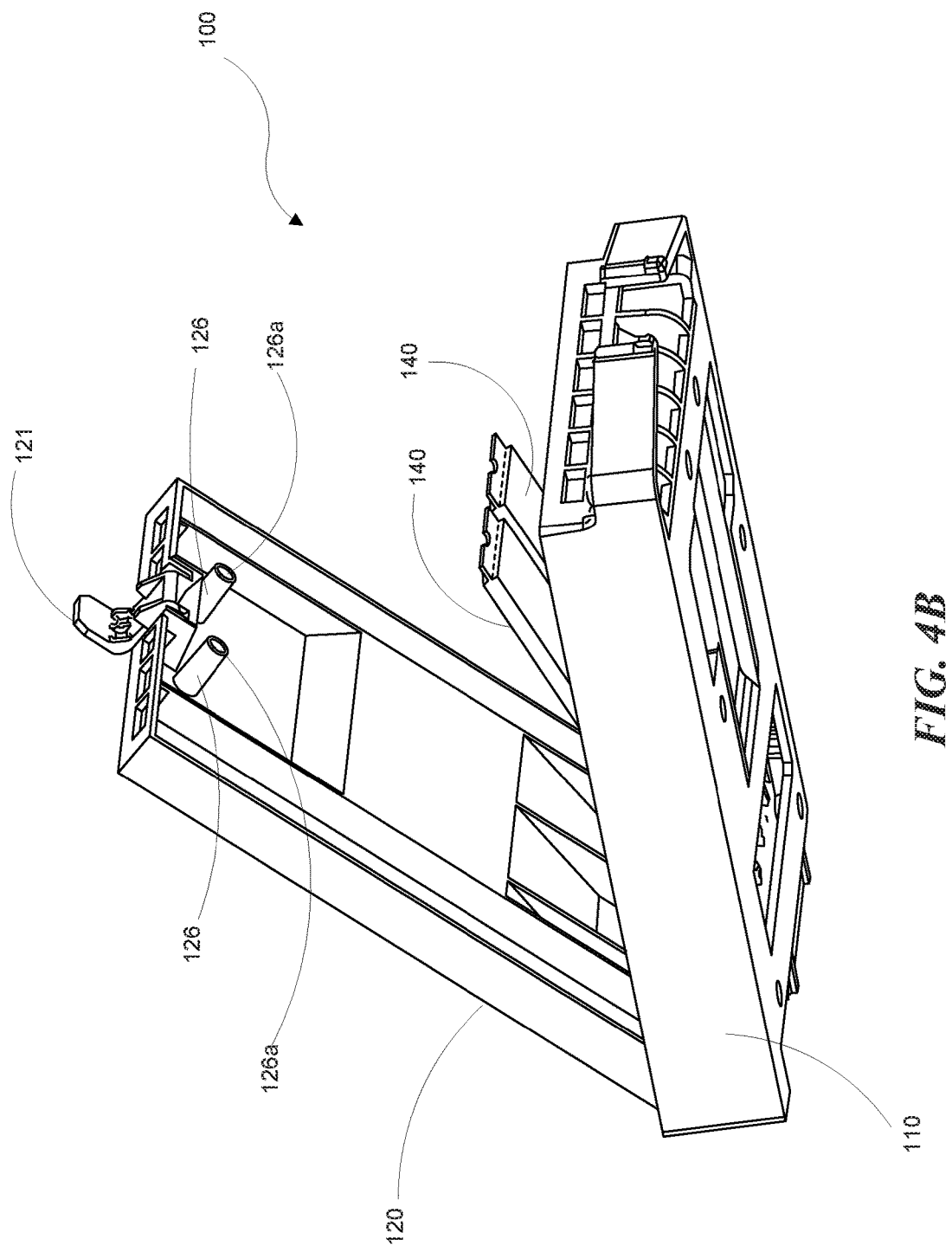

FIGS. 4A and 4B illustrate the manner in which storage cards 140 are initially installed in the storage card adapter 100. The storage cards 140 are initially positioned in the storage card connectors 131 at an acute angle (e.g., approximately 30 degrees) from the plane of the printed circuit board 130. The storage cards 140 can then be pivoted downwardly until the storage cards 140 are aligned in parallel with the printed circuit board 130. The tabs 123 (FIG. 3) of the adapter cover 120 are engaged with the vents 115 (FIGS. 2A and 2B) of the adapter frame 110, and this connection is used as a pivot point for lowering the opposite end of the adapter cover 120. The clamping posts 126 of the adapter cover 120 engage the ends of the storage cards 140 (and specifically the portions of these storage cards 140 that are relatively durable and/or non-functional to thereby minimize damage to the storage cards 140) as the adapter cover 120 is pivoted downwardly, forcing the storage cards 140 to also pivot downwardly. The storage cards 140 eventually come into contact with ledges 116a of the guide posts 116 as the smaller diameter portion of the guide posts 116 are received into the recesses 126a of the clamping posts 126.

Once the storage card 140 is resting against the ledge 116a and the distal portion of the guide post 116 is received in the recess 126a of the clamping post 126, the end of the storage card 140 becomes clamped between the guide post 116 and the clamping post 126. At this point, the latch 121 of the adapter cover 120 is engaged with the adapter frame 110 to thereby secure the storage cards 140 and resist any movement of the storage card 140 relative to the storage card connectors 131.

Figure 5:
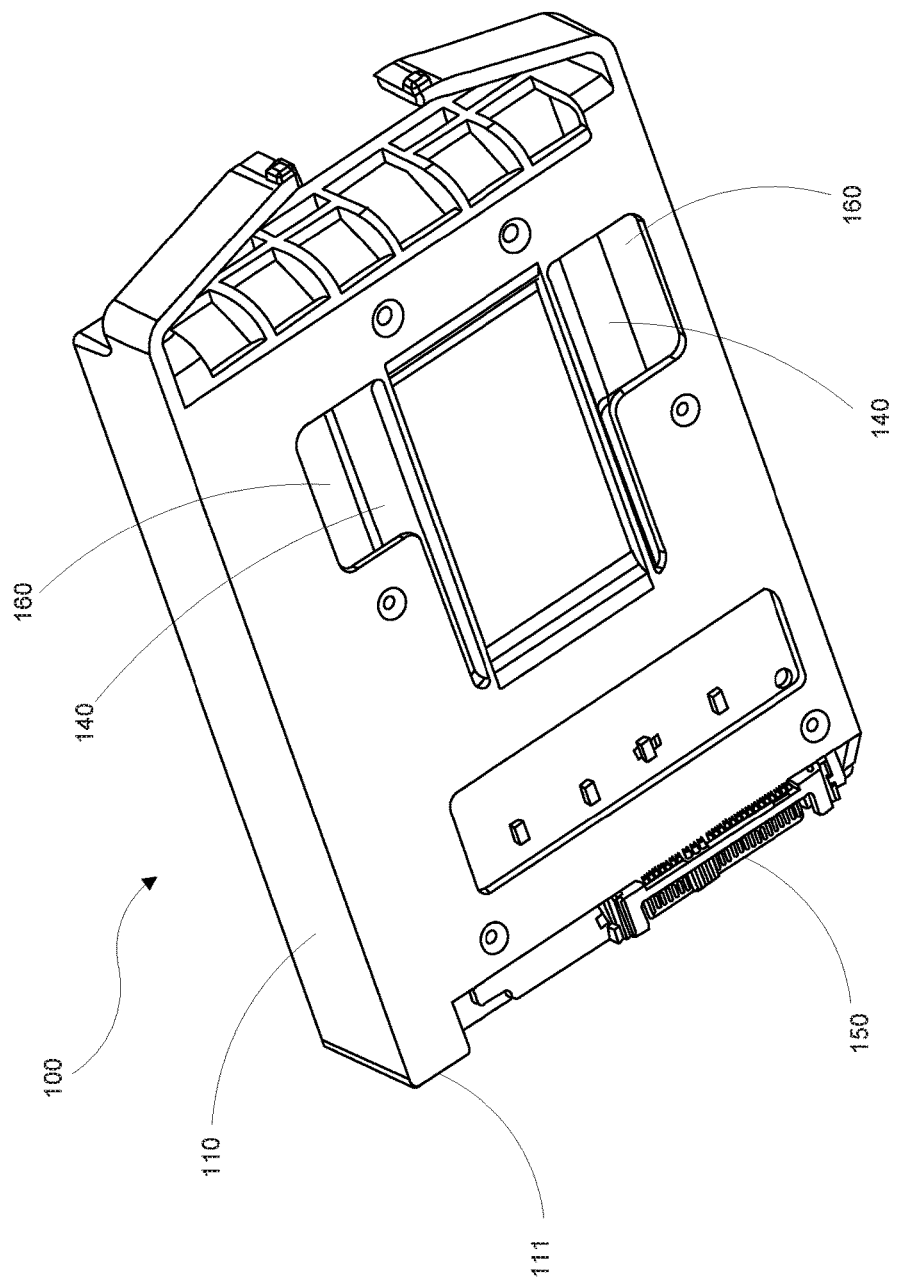
FIG. 5 is an isometric view of the storage card adapter shown in FIG. 1 viewed from the bottom.

With reference to FIG. 5, the bottom of the adapter frame 110 is illustrated. From this perspective, the printed circuit board connector 150 can be seen at the first end wall 111 of the adapter frame 110. The printed circuit board connector 150 extends out of an opening in the adapter frame 110 to allow for connection of the printed circuit board connector 150 to an external device. The bottom of the adapter frame 110 also includes two openings 160 that are positioned generally under the storage cards 140 housed within the storage card adapter 100. These openings 160 provide both ventilation and access to the storage cards 140. For example, the openings 160 allow for a user's finger or other tool to be inserted up through the openings 160 to move the storage cards 140 to the angled insertion position, which thereby allows for easier removal of the storage cards 140 from the storage card connectors.

The above described adapters are suitable for use when housing storage cards in storage card adapters suitable for insertion into drive bays. The storage card adapters are especially well suited for use when housing M.2 storage cards. As described in detail above, the configuration of the storage card adapters herein provides for securing a storage card within the storage card adapter but in a manner that reduces or eliminates the possibility of damaging the storage cards. The guide posts and clamping posts of the storage card adapter are specially designed to contact only portions of the storage card adapter that will not harm the functioning of the storage card adapter.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A storage card adapter usable with storage cards for insertion into a drive bay, the storage card adapter comprising:
   an adapter frame having an envelope compatible with the drive bay and a pair of guide posts, each guide post having a ledge configured to support an end portion of a storage card housed within the storage card adapter; and
   an adapter cover compatible with an open top of the adapter frame, the adapter cover having a pair of clamping posts, each clamping post positioned on the adapter cover to align with and contact one of the guide posts when the adapter cover is mated with the adapter frame;
   wherein the adapter frame is configured to receive a printed circuit board having a pair of storage card connectors and the pair of guide posts are each positioned in the adapter frame relative to the storage card connectors such that a distal end of a storage card inserted into one of the storage card connectors rests on the ledge of the guide post,
   wherein the adapter frame further comprises a printed circuit board connector located proximate the first end wall, and
   wherein the printed circuit board connector is spaced apart from the guide posts such that when a printed circuit board having a pair of storage card connectors is connected to the printed circuit board connector, a distal end of a storage card inserted in one of the storage card connectors rests on the ledge of each guide post.

2. The storage card adapter of claim 1, wherein each guide post comprises a tapered terminal end and the ledge is formed where the tapered terminal end begins on the guide post.

3. The storage card adapter of claim 2, wherein a terminal end of each clamping post includes a recess and the recess is sized to receive the tapered terminal end of the guide post with which it is aligned.

4. The storage card adapter of claim 1, wherein the ledge is positioned to support the distal end portion of the storage card so the storage card is parallel with the bottom wall of the adapter frame.

5. The storage card adapter of claim 1, wherein the adapter cover includes a latch configured to snap fit with the adapter frame when the adapter cover is mated with the adapter frame.

6. The storage card adapter of claim 1, wherein the adapter frame includes a first end wall and a second end wall opposite the first end wall, and wherein the first end wall and the second end wall each include a plurality of vents.

7. The storage card adapter of claim 1, wherein the adapter frame includes a bottom wall and the bottom wall includes a pair of openings located under the storage cards when the storage cards are housed within the storage card adapter.

8. A storage card adapter usable with storage cards for insertion into a drive bay, the storage card adapter comprising:
   an adapter frame having an envelope compatible with the drive bay, the adapter frame comprising:
   a bottom wall;
   a first end wall and a second end wall spaced apart from the first end wall;
   an open top;
   a pair of guide posts located proximate the second end wall, wherein each guide post comprises:
   a first section having a first diameter; and
   a second section having a second diameter smaller than the first diameter such that a ledge is formed at the transition from the first section to the second section; and
   an adapter cover compatible with the open top of the adapter frame, the adapter cover comprising:
   a pair of clamping posts located proximate a first end of the adapter cover, each clamping post having a recess at a distal end of the clamping post;
   wherein each clamping post is aligned with one of the guide posts when the adapter cover is mated with the adapter frame such that the second section of the guide post is received within the recess of the clamping post,
   wherein the adapter frame is configured to receive a printed circuit board having a pair of storage card connectors and the pair of guide posts are each positioned in the adapter frame relative to the storage card connectors such that a distal end of a storage card inserted into one of the storage card connectors rests on the ledge of the guide post,
   wherein the adapter frame further comprises a printed circuit board connector located proximate the first end wall, and
   wherein the printed circuit board connector is spaced apart from the guide posts such that when a printed circuit board having a pair of storage card connectors is connected to the printed circuit board connector, a distal end of a storage card inserted in one of the storage card connectors rests on the ledge of each guide post.

9. The storage card adapter of claim 8, wherein the guide posts and the clamping posts are configured to clamp a distal end of a storage card inserted in a storage card connector of a printed circuit board connected to the printed circuit board connector between the ledge of guide post and a distal end of the clamping post.

10. The storage card adapter of claim 8, wherein each guide post extends away from the bottom wall of the adapter frame in a direction perpendicular to the bottom wall.

11. The storage card adapter of claim 8, wherein each clamping post extends away from the adapter cover in a direction perpendicular to the adapter cover.

12. The storage card adapter of claim 8, wherein the adapter cover further comprises:
   a first end wall and a second end wall spaced apart from the first end wall, and wherein the second end wall includes a plurality of vents; and
   a latch on the second end wall of the adapter cover, the latch configured to snap fit with the second end wall of the adapter frame when the adapter cover is mated with the adapter frame.

13. The storage card adapter of claim 8, wherein the adapter cover comprises a depression in a central region of the adapter cover.

14. The storage card adapter of claim 8, wherein the bottom wall of the adapter frame comprises a pair of openings located under the storage cards when the storage cards are housed within the storage card adapter.

15. A storage card adapter usable with storage cards for insertion into a drive bay, the storage card adapter comprising:
   an adapter frame having an envelope compatible with the drive bay and a pair of card support members, each card support member having a ledge configured to support an end portion of a storage card housed within the storage card adapter; and
   an adapter cover compatible with an open top of the adapter frame, the adapter cover having a pair of clamping members, each clamping member positioned on the adapter cover to align with and contact one of the card support members when the adapter cover is mated with the adapter frame;
   wherein the adapter frame is configured to receive a printed circuit board having a pair of storage card connectors and the pair of guide posts are each positioned in the adapter frame relative to the storage card connectors such that a distal end of a storage card inserted into one of the storage card connectors rests on the ledge of the guide post,
   wherein the adapter frame further comprises a printed circuit board connector located proximate the first end wall, and
   wherein the printed circuit board connector is spaced apart from the guide posts such that when a printed circuit board having a pair of storage card connectors is connected to the printed circuit board connector, a distal end of a storage card inserted in one of the storage card connectors rests on the ledge of each guide post.

16. The storage card adapter of claim 15, wherein the adapter frame is configured to receive a printed circuit board having a pair of storage card connectors and the pair of card support members are positioned in the adapter frame relative to the storage card connectors such that a distal end of a storage card inserted into one of the storage card connectors rests on the ledge of the card support member.

17. The storage card adapter of claim 16, wherein the ledge is positioned to support the distal end portion of the storage card so the storage card is parallel with the bottom wall of the adapter frame.

* * * * *